United States Patent [19]

Speiser

[11] 3,831,044

[45] Aug. 20, 1974

[54] CODED GRATING TRANSDUCER

[75] Inventor: Jeffrey M. Speiser, San Diego, Calif.

[73] Assignee: The United States of America as represented by the Secretary of the Navy, Washington, D.C.

[22] Filed: Nov. 7, 1973

[21] Appl. No.: 413,485

[52] U.S. Cl. .................... 310/9.8, 333/30 R, 333/72

[51] Int. Cl. .......................... H01v 7/00, H04r 17/00

[58] Field of Search ....................... 310/8.1, 9.7, 9.8; 333/30 R, 72; 181/.5 AP

[56] References Cited

UNITED STATES PATENTS

| | | | |
|---|---|---|---|
| 3,551,837 | 12/1970 | Speiser et al. | 310/9.8 X |
| 3,675,052 | 7/1972 | Lindsey et al. | 310/9.8 X |
| 3,680,007 | 7/1972 | Tseng | 310/9.8 X |
| 3,681,579 | 8/1972 | Schweitzer | 333/30 X |
| 3,727,718 | 4/1973 | Whitehouse | 333/30 X |
| 3,757,256 | 9/1973 | Whitehouse et al. | 333/30 X |
| 3,800,248 | 3/1974 | Speiser et al. | 310/9.8 X |

*Primary Examiner*—Mark O. Budd
*Attorney, Agent, or Firm*—Richard S. Sciascia; Ervin F. Johnston; John Stan

[57] ABSTRACT

A coded, acoustic, surface-wave, device having a high input impedance, comprising a substrate, and an input and an output transducer, both disposed upon the substrate. The input transducer comprises a plurality of N linear, parallel, equally-spaced electrodes and a plurality of N−1 sets of linear, parallel, electrodes, shorter in length than the first-named plurality of longer electrodes, and interposed between, parallel to, and equally spaced between, the longer electrodes, the shorter electrodes being disposed at one or the other end of the longer electrodes, in either the upper or lower propagation channel. The combination of placements form a code. The output transducer disposed upon the substrate comprises: a longer electrode, spaced a distance apart from, and parallel to the electrodes of, the input transducer, which first intercepts the propagating acoustic wave; and a pair of sets of shorter electrodes; a pair of output electrodes, approximately equal in length to either of the other named shorter electrodes, for providing a transduced electrical signal.

9 Claims, 6 Drawing Figures

CODED GRATING TRANSDUCER, USING SIMPLE GRATING TRANSDUCERS FOR THE SUBARRAYS, WITH CODING 1,1,-1,1.

CODED GRATING TRANSDUCER CONCEPT, IN THE FORM OF A TRANSVERSAL FILTER WITH CODING 1,1,-1,1.

CODED GRATING TRANSDUCER, USING SIMPLE GRATING TRANSDUCERS FOR THE SUBARRAYS, WITH CODING 1,1,-1,1.

CODED GRATING TRANSDUCER, USING INTERDIGITAL TRANSDUCERS FOR THE SUBARRAYS, ILLUSTRATED IN A TRANSVERSAL FILTER WITH CODING 1,1,-1,1.

CODED GRATING TRANSDUCER, USING SIMPLE GRATING TRANSDUCERS FOR THE SUBARRAYS, ILLUSTRATED WITH CODING 1, 1, -1, 1.

CODED GRATING TRANSDUCER WITH WEIGHTING 1, 0.5, -1 IN TRANSVERSAL FILTER CONFIGURATION.

CODED GRATING TRANSDUCER WITH ALTERNATE FORM OF CODING.

CODED GRATING TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a high-impedance coded transducer for use in acoustic surface wave devices, including transversal filters, broadband delay lines, and cross-convolvers.

In the prior art, two types of transducers are in common use for generating and detecting acoustic surface waves on piezoelectric substrates. The interdigital transducer and the grating transducer: Methods of coding the interdigital transducer are now well known. For example, see Speiser, Jeffrey M. and Whitehouse, Harper J., *Surface Wave Transducer Array Design Using Transversal Filter Concepts*, in "Acoustic Surface Wave and Acousto-Optic Devices," edited by Thomas Kallard, Optosonic Press, 1971, pp. 81–90. The principal defect of the interdigital transducer is its low electrical impedance, since it consists of a number of small transducers connected electrically in parallel. This presents a particularly severe problem when many electrodes are used in a coded interdigital transducer on a high-coupling substrate, since to minimize the production of regenerated surface waves, for an array of transducers connected electrically in parallel, it is desirable to drive the transducer with a source whose impedance is low compared to that of the transducer. The high-impedance source required for the dual problem is more readily implemented.

The grating transducer, reported on by the Stanford Research Institute, permits one to obtain a transducer array having a high input impedance, but it has not been shown how to use such a transducer in applications where a coded transducer is needed, such as in a transversal filter or broadband delay line, or broadband cross-convolver. Reference is directed to the article by Bahr, A. J., Lee, R. E., and Podell, A. F., *The Grating Array: A New Acoustic Surface Wave Transducer*, presented as paper P-6 at the 1971 IEEE Ultrasonics Symposium, Miami Beach, Fla. Dec. 6–8, 1971.

SUMMARY OF THE INVENTION

This invention relates to an acoustic surface-wave device which comprises a transducer array which consists of a number of smaller arrays, or subarrays, connected electrically in series, and displaced from one another on a piezoelectric substrate so as to form two parallel acoustic beams, or propagation channels, one corresponding to the positive weights in the desired coding, and one corresponding to the negative weights. To form a transversal filter, the two beams are intercepted by a differential transducer.

The essential requirement for straightforward coding of the array is that the capacitance between any two adjacent major vertical electrodes, which divide one subarray from another, shall be the same. The array will then consist of a number of subarrays, electrically in series, with the same voltage appearing across each subarray.

The specific form of the subarray may comprise (1) short vertical electrodes; (2) short interdigitated electrodes; (3) short vertical electrodes with a material deposited upon them; and (4) short, vertical, weighted, electrodes.

OBJECTS OF THE INVENTION

An object of the invention is to provide a high-impedance surface-wave device.

Another object of the invention is to provide a high-impedance surface-wave device which can be coded.

Yet another object of the invention is to provide a high-impedance, coded, surface-wave device suitable for use as a transversal-filter, broadband delay line, or cross-convolver.

Other objects, advantages and novel features of the invention will become apparent from the following detailed description of the invention, when considered in conjunction with the accompanying drawings, wherein:

DESCRIPTION OF THE PREFERRED EMBODIMENTS

Figure 1:
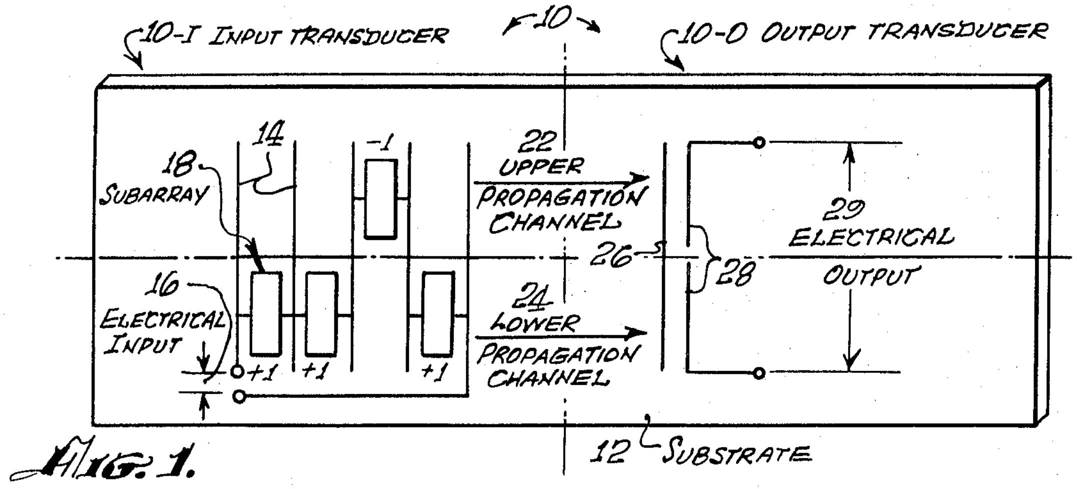
FIG. 1 is a partially schematic and partially diagrammatic view of a generalized coded grating transducer, in the form of a transversal filter with a subarray coding of 1, 1, −1, 1.

Referring now to FIG. 1, this figure shows a coded, acoustic, surface-wave, device 10 having a high input impedance, comprising a substrate 12 and an input transducer 10–I disposed upon the substrate. The input transducer 10–I comprises a plurality of N linear, parallel, equally spaced electrodes 14 disposed upon the substrate 12. The two end electrodes are connectable to an input electrical signal, at input 16, which causes the propagation of an acoustic signal across the surface of the substrate 12, the acoustic signal comprising two components, an upper component propagating in an upper propagation channel 22 and a lower component propagating in a lower propagation channel 24.

In the generalized coded grating transducer 10 shown in FIG. 1, a set of shorter electrodes is shown in general form by the rectangular block labeled 18 SUBARRAY. The shorter electrodes designated subarray 18 are disposed at one or the other end of the longer electrodes 14, in either the upper or lower propagation channel, 22 or 24, the combination of placements forming a code.

The surface-wave device 10 further comprises an output transducer 10-0 disposed upon the substrate 12, which comprises a longer electrode 26, spaced a distance apart from, and parallel to the electrodes of, the input transducer 10–I, which first intercepts the propagating acoustic wave.

In the embodiment 10 shown in FIG. 1, as well as in all the other embodiments of this invention, the output transducer, 10–0 in FIG. 1, serves as a differential transducer to an acoustic signal.

Discussing briefly the theory behind the invention, a specific type of acoustic surface wave to be generated is chosen, and it is divided into positive and negative parts. What actually transpires is that the positive parts of the signal are launched on one half, the top half, of the substrate, and the negative parts of the signal on the other half of the substrate.

The desired impulse response of the transducer is taken, by breaking it up into its positive and negative halves, which are realized separately.

If a sequence of pulses having the polarities 1, 1, −1 and 1 be impressed at the input 16, a maximum output would be obtained at the output 29 of the transducer 10, since correlation is obtained.

In many transducer devices, the input signal is impressed between the two leftmost electrodes. However, in FIG. 1, the input 16 is between the extreme left-hand electrode and the extreme right-hand electrode of the input transducer 10–I. The speed of surface-wave propagation is relatively slow, compared to the speed of light, so that, electrically, as far as the input transducer 10–I is concerned, it acts as a capacitor. Assuming a voltage is applied between the extreme left-hand and right-hand electrodes, the transducer acts as a capacitive voltage divider. Effectively, there is a bank of capacitors in series.

In more detail, assume five large vertical electrodes 14, as are shown in FIG. 1. The device acts like four capacitors in series. Equal voltages will appear across each of the four regions between any two adjacent electrodes. Effectively, there is produced a differential excitation of surface waves in each of the four regions, where one half of the region, either the upper or the lower half, would be preferentially excited, depending upon the polarity of the code in that region.

Figure 2:
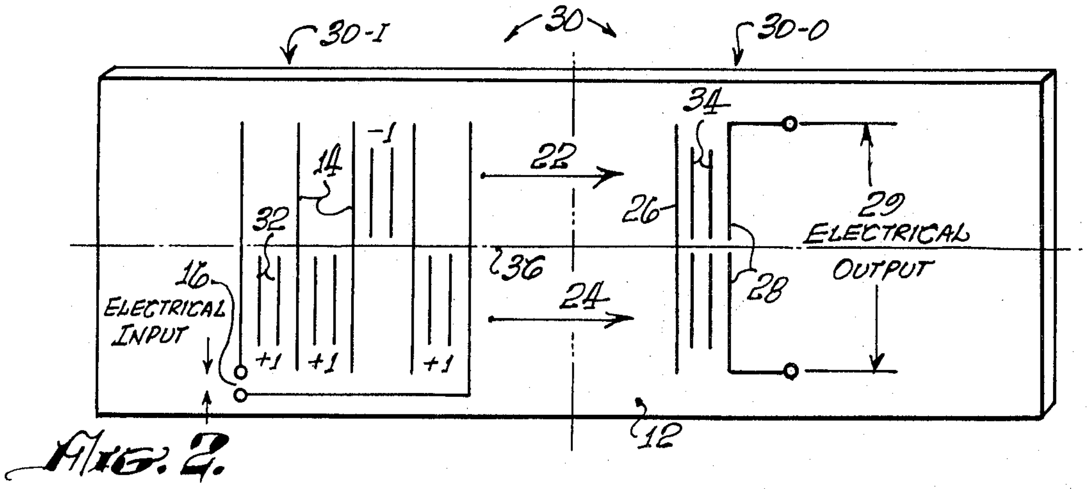
FIG. 2 is a schematic diagram of a coded grating transducer having the same subarray coding as in FIG. 1, but using simple vertical transducers for the subarrays.

Referring now to FIG. 2, this figure shows a coded, acoustic, surface-wave, device 30 having a high input impedance, comprising a substrate 12 and an input transducer 30–I disposed upon the substrate. As in the embodiment 10 shown in FIG. 1, the input transducer 30–I comprises a plurality of N linear, parallel, equally-spaced electrodes 14 disposed upon the substrate 12.

The generalized subarray 18 of FIG. 1 takes the form in FIG. 2 of a plurality of N−1 sets of linear, parallel, electrodes 32, shorter in length than the first-named plurality of longer electrodes 14, and interposed between, parallel to, and equally spaced between, the longer electrodes, each set including at least one short electrode. The shorter electrodes 32 are disposed at one or the other end of the longer electrodes 14, in either the upper or lower propagation channel, 22 or 24, the combination of placements of sets of electrodes 14 forming a code. Two adjacent electrodes, 14 or 32 whether long or short, are spaced the same distance apart.

The surface-wave device 30 further comprises an output transducer 30–0 disposed upon the substrate 12, which comprises a longer electrode 26, spaced a distance apart from, and parallel to the electrodes, 14 and 32, of the input transducer 30–I, which first intercepts the propagating acoustic wave.

The output transducer 30–0 also includes a pair of sets of shorter electrodes 34, of substantially the same length as the first-named shorter electrodes 32, the number of electrodes in each pair being equal to the number of electrodes in the first-named set of shorter electrodes, one set of the pair being disposed at each end of, and parallel to, the longer electrode 26, one set being in each of the two propagation channels 22 and 24. A pair of output electrodes 28, approximately equal in length to either of the other named shorter electrodes, 32 and 34, provides a transduced electrical output signal. In FIG. 2, the shorter electrodes, 32 and 34, are approximately one-half the length of the longer electrodes, 14 and 26, so that they do not overlap with respect to any horizontal line perpendicular to the electrodes.

The surface-wave device, 10 of FIG. 1 or 30 of FIG. 2 often has a substrate 12 which is piezoelectric.

With respect to FIG. 2, looking from left to right, there are regions wherein an electrical field can be present, so that surface waves can be generated. The sets of two short fingers 32 could in other instances be any number from one to ten.

Assume a horizontal line 36 through the middle of the substrate, effectively forming two acoustic propagation channels, 22 and 24, on the substrate 12, one on the upper vertical half of the substrate, and the other on the lower vertical half of the array.

A region between two long vertical lines 14 forms a comparatively extended region. For purposes of this discussion it may be assumed that there are ten short bars rather than the two labelled 32, shown. Now with any given spacing of the two long vertical bars 14 the resonant frequency formed by a line pair is relatively low if only two short lines are present, whereas if there are many lines with a short spacing between them, they are resonant at a frequency at which the spacing between them is a quarter-wavelength at a much higher frequency.

The wavelength determined by the distance between adjacent fingers is a quarter-wavelength, that is, between a long finger 14 and the nearest short finger 32. In that frequency region where there is a stack of vertical lines closely spaced, they would launch surface waves. But where there are two adjacent vertical lines with a comparatively large spacing between them, there will be little or no surface wave generation.

Figure 3:
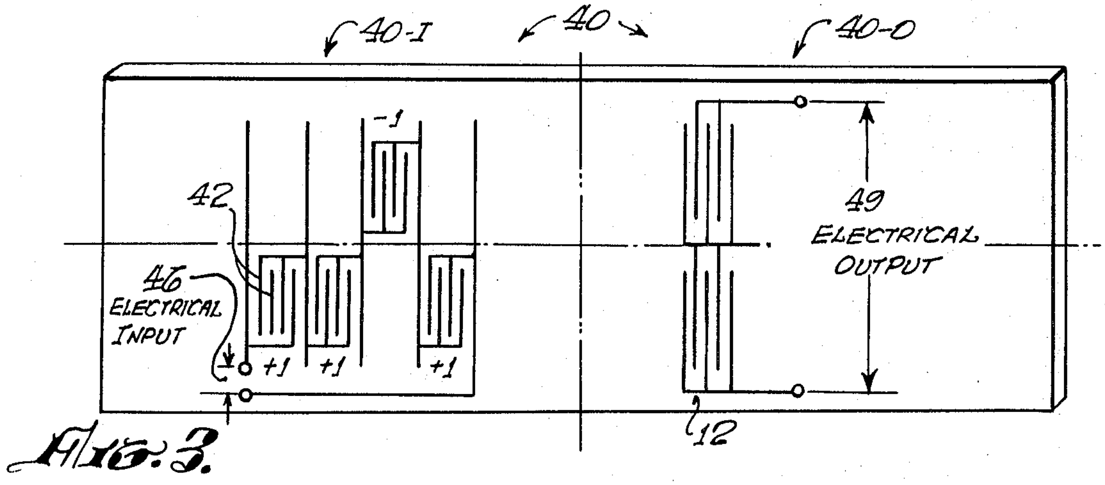
FIG. 3 is a schematic diagram of a coded grating transducer having the same subarray coding as in FIGS. 1 and 2, but using interdigital transducers for the subarrays.

Referring now to FIG. 3, this figure illustrates a surface-wave device 40 wherein the shorter electrodes 42 are interdigitated.

In FIG. 2, input transducer 30–I is essentially a capacitive voltage divider. FIG. 3, in contrast, shows an input transducer 40–I which comprises series arrangement of subarrays, the interdigitated transducers, the electrodes 42 of each subarray being in parallel. Therefore, the interdigitations provide another degree of freedom in controlling the capacitance and therefore the impedance of the grating transducer 40. The configuration shown in FIG. 3 provides an impedance intermediate between that shown in FIG. 2 and a simple, conventional, interdigitated transducer.

Figure 4:
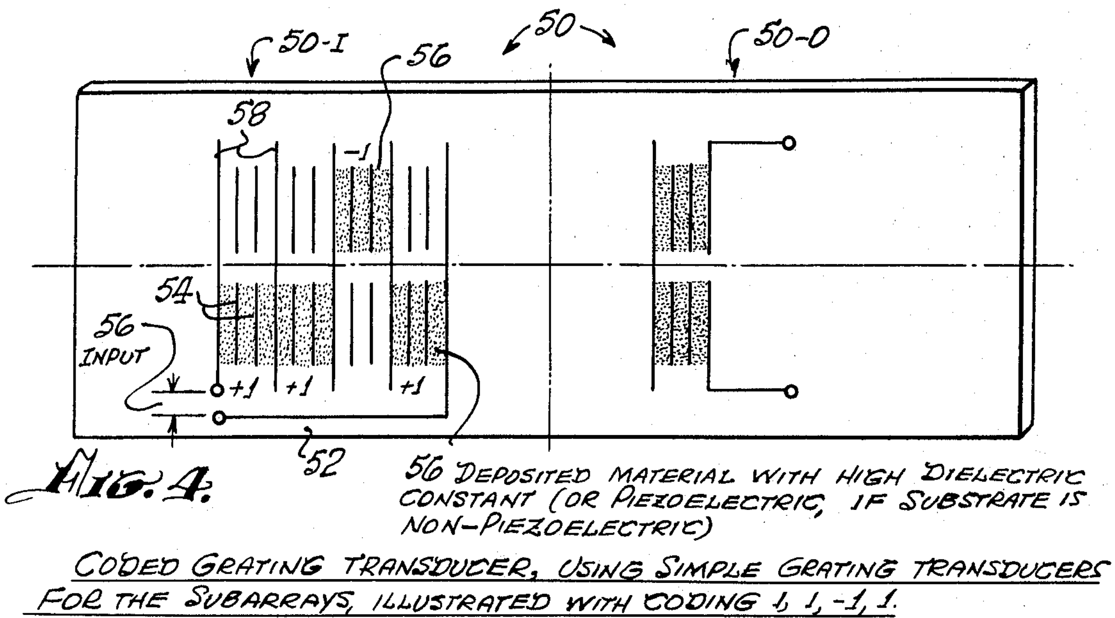
FIG. 4 is a partially schematic and partially diagrammatic view of a grating transducer in which the coding results from selective coating of subarrays by a deposited material over some of the sets of electrodes.

Referring now to FIG. 4, this figure illustrates a surface-wave device 50 which further comprises a material 56 having a high dielectric constant deposited upon selected placements of the sets of the shorter electrodes 54, the deposited areas forming a code, 1, 1, −1 and 1, in this case also.

In an alternative embodiment of the surface-wave device 50 shown in FIG. 4, the substrate 52 may be non-piezoelectric and further comprise a piezoelectric material 56 deposited upon selected placements of the shorter electrodes 54, the deposited areas forming a code.

The coded grating transducer 40 shown in FIG. 4 provides another manner in which the overall capacitance of the transducer may be varied.

Similarly to the other embodiments discussed hereinabove, there is a voltage divider action across the transducer 50, with the same voltage appearing across any two adjacent long vertical electrodes 58, regardless of the polarity of the coding in any specific region, or subarray.

In the regions where the material having a high dielectric constant is not deposited, the short electrodes 54 are not absolutely required.

Figure 5:
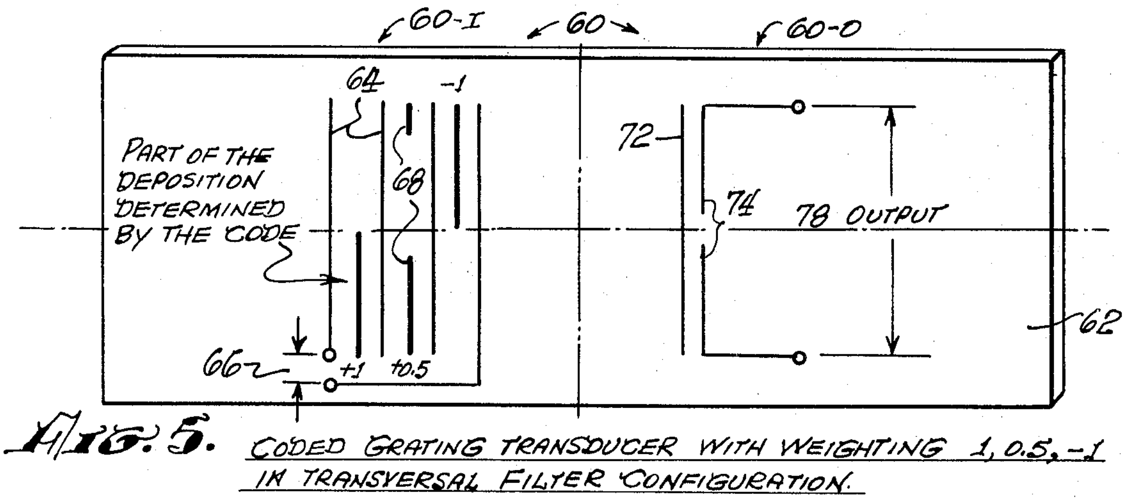
FIG. 5 is a schematic diagram of a coded grating transducer in which each subarray consists of a single weighted electrode.
Figure 6:
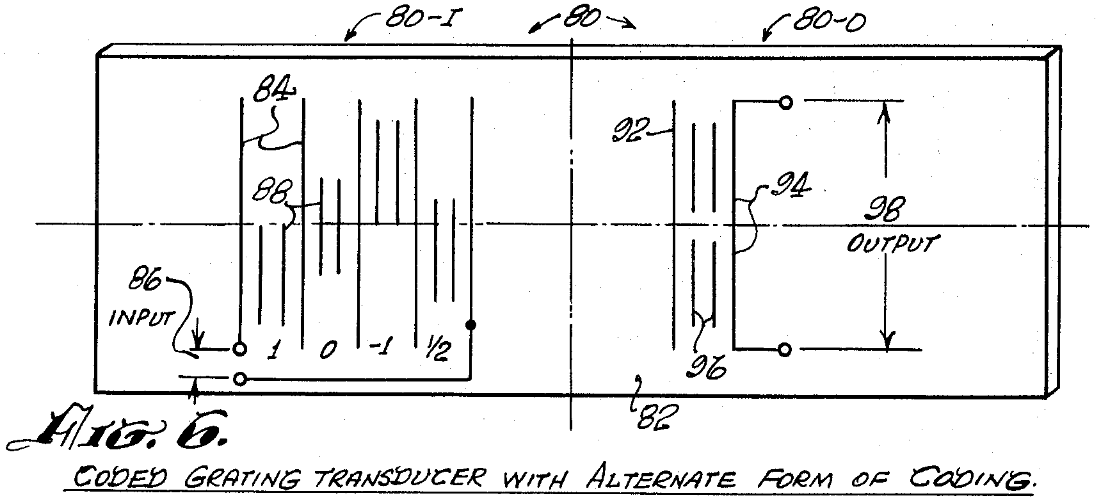
FIG. 6 is a schematic diagram of a coded grating transducer in which the weighting is accomplished by offsetting electrodes in some of the arrays in vertical direction with respect to other electrodes in other arrays.

Discussing now different types of coded grating transducers, shown in FIGS. 5 and 6, the codings may be made non-binary if desired, by utilizing the differential structure of the transducer, and treating each subarray as an opposed pair, subject only to the constraint that the sum of the capacitance of the positive and negative parts of the subarray shall be the same for each subarray. This may be accomplished by varying the electrode length as is shown in FIG. 5; or the length of the region in which dielectric (or piezoelectric material) shown in FIG. 4 is added; or by the amount of offset of shorter electrodes 84 as shown in FIG. 6.

Let the respective lengths of the positive and negative sections be P and N, where the dimensions are normalized so that P+N=1. If X is the desired weight for the code element, then $$P+N=1$$
$$P-N=X$$
$$2P=X+1$$
$$2N=1-X$$

or $$P=0.5(1+X)$$
$$N=0.5(1-x)$$

For example, if the weight ½ is desired, then:

$$P=0.5(1.5)=0.75$$
$$N=0.5(.5)=0.25$$

Referring now to FIGS. 5 and 6, these figures show coded, acoustic, surface-wave, device, 60 or 80, having a high input impedance, comprising a substrate, 62 or 82 and an input transducer 60–I or 80–I, disposed upon the substrate.

The input transducer, 60–I or 80–I, comprises a plurality of N linear, parallel, equally-spaced electrodes, 64 or 84, disposed upon the substrate, 62 or 82. The two end electrodes, 64 or 84, are connectable to an input electrical signal, 66 or 86, which causes the propagation of an acoustic signal across the surface of the substrate, 62 or 82, the acoustic signal comprising two components, an upper component propagating in an upper propagation channel and a lower component propagating in a lower propagation channel.

A plurality of sets of linear, parallel, electrodes, 68 or 88, each electrode being shorter in length, by at least one-half, than the electrodes 64 or 84 of the plurality of electrodes, are interposed between, parallel to, and equally spaced between, the longer electrodes. The shorter electrodes, 68 and 88, are displaced vertically toward one or the other end of the longer electrodes, 64 or 84.

The combination of placements of the sets of the electrodes, 68 or 88, forms a weighted code. Two adjacent electrodes, whether long or short, are spaced the same distance apart.

The surface-wave device, 60 or 80, further comprises an output transducer, 60–0 or 80–0, disposed upon the substrate, 62 or 82, which comprises a longer electrode, 72 or 92, of substantially the same length as each electrode, 64 or 84, of the plurality of electrodes, spaced a distance apart from, and parallel to the electrodes of, the input transducer, 60–I or 80–I, which first intercepts the propagating acoustic wave. A pair of output electrodes, 78 or 98, of approximately half the length of the longer electrode, 72 or 92, serve for providing a transduced electrical output signal, at outputs 78 and 98.

In the surface-wave device 60 shown in FIG. 5, some of the sets of electrodes 68 may consist of two electrodes, one aligned vertically with the other at one or the other end of the longer electrodes 64, the relative size of one electrode with respect to the other forming the magnitude of the code of that electrode, the polarity of the code depending on whether the upper or lower of the two electrodes is the larger.

FIG. 6 shows an embodiment with another type of electrode weighting. Therein is shown a surface-wave device 80 wherein each of the sets of electrodes consists of at least one electrode 88, all electrodes of a set being parallel to each other in a vertical direction, the coding of the set of electrodes being a function of the relative vertical displacement of one set of electrodes with respect to another set.

In contrast to the embodiment 60 shown in FIG. 5, the output transducer 80–0 of FIG. 6 includes two sets 96 of shorter electrodes.

FIG. 6 shows a coded grating transducer 80 with an arbitrary coding 1, 0, −1, 0.5. The configuration shown in FIG. 6 has the advantage over the configuration 60 shown in FIG. 5 in that there is considerably less diffraction spreading of the beam when all electrodes are of the same length. In FIG. 6 the electrodes 88 are of constant length, whereas in FIG. 5 the sum of the lengths of two electrodes 64 in the same vertical alignment is constant.

Parenthetically, FIG. 2 shows a configuration 30 which is an extreme case of the embodiment 80 shown in FIG. 6. If the electrodes 88 in the subarrays with the coding 0 and ½ are displaced vertically downward by a maximum feasible amount, the configuration shown in FIG. 2 results.

With respect to advantages and new features of the invention, these are believed to be the first coded transducers for acoustic surface waves having high input impedance. They are easier to drive electrically than the interdigital transducer. Unlike the simple grating transducer, the coded transducer shown herein may be used to implement transversal filters, broadband delay lines and other devices which depend critically upon the transducer coding. The transducer weighting by varying the location of a dielectric or piezoelectric overlay is also believed to be new.

With respect to alternative embodiments, when non-binary weightings are desired, the thickness of the dielectric or piezoelectric overlays may be varied instead of their length. This permits the full length of each transducer element to be utilized, thus minimizing beams spreading due to diffraction.

Obviously many modifications and variations of the present invention are possible in the light of the above teachings. It is therefore to be understood that within the scope of the appended claims the invention may be practiced otherwise than as specifically described.

What is claimed is:

1. A coded, acoustic, surface-wave, device having a high input impedance, comprising:

a substrate;

an input transducer disposed upon the substrate, which comprises:

a plurality of N linear, parallel, equally-spaced electrodes disposed upon the substrate;

the two end electrodes being connectable to an input electrical signal, which causes the propagation of an acoustic signal across the surface of the substrate, the acoustic signal comprising two components, an upper component propagating in an upper propagation channel, and a lower component propagating in a lower propagation channel;

a plurality of N–1 sets of linear, parallel, electrodes, shorter in length than the first-named plurality of longer electrodes, and interposed between, parallel to, and equally spaced between, the longer electrodes, each set including at least one short electrode;

the shorter electrodes being disposed at one or the other end of the longer electrodes, in either the upper or lower propagation channel;

the combination of placements forming a code;

two adjacent electrodes, whether long or short, being spaced the same distance apart;

the surface-wave device further comprising an output transducer disposed upon the substrate, which comprises;

a longer electrode, spaced a distance apart from, and parallel to the electrodes of, the input transducer, which first intercepts the propagating acoustic wave;

a pair of sets of shorter electrodes, of substantially the same length as the first-named shorter electrodes, the number of electrodes in each pair being equal to the number of electrodes in the first-named set of shorter electrodes, one set of the pair being disposed at each end of, and parallel to, the longer electrode, one set in each of the two propagation channels; and a pair of output electrodes, approximately equal in length to either of the other named shorter electrodes, for providing a transduced electrical output signal.

2. The surface-wave device according to claim 1, wherein the shorter electrodes are approximately one-half the length of the longer electrodes, so that they do not overlap with respect to any horizontal line perpendicular to the electrodes.

3. The surface-wave device according to claim 2, wherein the shorter electrodes are interdigitated.

4. The surface-wave device according to claim 2, wherein the substrate is piezoelectric.

5. The surface-wave device according to claim 2, further comprising:

a material having a high dielectric constant deposited upon selected placements of the sets of the shorter electrodes, the deposited area forming a code.

6. The surface-wave device according to claim 2, wherein the substrate is non-piezoelectric; and further comprising:

a piezoelectric material deposited upon selected placements of the shorter electrodes, the deposited areas forming a code.

7. A coded, acoustic, surface-wave, device having a high input impedance comprising:

a substrate;

an input transducer disposed upon the substrate, which comprises:

a plurality of N linear, parallel, equally-spaced electrodes disposed upon the substrate;

the two end electrodes being connectable to an input electrical signal, which causes the propagation of an acoustic signal across the surface of the substrate, the acoustic signal comprising two components, an upper component propagating in an upper propagation channel and a lower component propagating in a lower propagation channel;

a plurality of sets of linear, parallel, electrodes, each electrode being shorter in length, by at least one-half, than the electrodes of the plurality of electrodes, and interposed between, parallel to, and equally spaced between, the longer electrodes;

the shorter electrodes of each set being displaced vertically toward one or the other end of the longer electrodes;

the combination of placements of the sets of electrodes forming a weighted code;

two adjacent electrodes, whether long or short, being spaced the same distance apart;

the surface-wave device further comprising an output transducer disposed upon the substrate, which comprises;

a longer electrode, of substantially the same length as each of the plurality of electrodes, spaced a distance apart from, and parallel to the electrodes of, the input transducer, which first intercepts the propagating acoustic wave; and a pair of output electrodes, of approximately half the length of the longer electrode, for providing a transduced electrical output signal.

8. The surface-wave device according to claim 7, wherein:

each of the sets of electrodes consists of two electrodes, one aligned vertically with the other at one or the other end of the longer electrodes, the relative size of one electrode with respect to the other forming the magnitude of the code of that electrode, the polarity of the code depending on whether the upper or lower of the two electrodes is the larger.

9. The surface-wave device according to claim 7, wherein some of the sets of electrodes consists of at least one electrode, all electrodes of a set being parallel to each other in a vertical direction, the coding of the set of electrodes being a function of the relative vertical displacement of one set of electrodes with respect to another set; and wherein:

the output transducer further comprises a pair of sets of parallel electrodes, one set vertically disposed above the other set, each electrode being of substantially the same length as the electrodes of the plurality of electrodes, both sets being interposed between and parallel to the other electrodes of the output transducer.

* * * * *